(12) United States Patent
Demmig et al.

(10) Patent No.: US 8,778,131 B2
(45) Date of Patent: Jul. 15, 2014

(54) USE OF DISPERSION ADHESIVE-COATED POLYVINYL CHLORIDE SEALING FILMS FOR PRODUCING A SEAL

(75) Inventors: Martin Demmig, Quickborn (DE); Andre Buchholz, Ritterhude (DE); Christina Bosse, Hamburg (DE); Martin Linnenbrink, Apensen (DE)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 13/882,668

(22) PCT Filed: Dec. 14, 2011

(86) PCT No.: PCT/EP2011/072794
§ 371 (c)(1),
(2), (4) Date: Apr. 30, 2013

(87) PCT Pub. No.: WO2012/080354
PCT Pub. Date: Jun. 21, 2012

(65) Prior Publication Data
US 2013/0212968 A1    Aug. 22, 2013

(30) Foreign Application Priority Data

Dec. 17, 2010 (EP) .................................. 10195805

(51) Int. Cl.
| | |
|---|---|
| *E04B 2/00* | (2006.01) |
| *E04F 13/00* | (2006.01) |
| *C09J 4/00* | (2006.01) |
| *C09J 101/00* | (2006.01) |
| *C09J 201/00* | (2006.01) |
| *B29C 65/00* | (2006.01) |
| *C09J 175/04* | (2006.01) |
| *C09J 175/14* | (2006.01) |
| *E04D 11/02* | (2006.01) |

(52) U.S. Cl.
CPC ................. *B29C 66/45* (2013.01); *B22B 27/04* (2013.01); *C09J 175/04* (2013.01); *C09J 175/14* (2013.01); *E04D 11/02* (2013.01)
USPC ......................................... 156/331.4; 156/71

(58) Field of Classification Search
CPC ........ B29C 66/45; B32B 27/04; C09J 175/04; C09J 175/14; E04D 11/02
USPC .................................................. 156/71, 331.4
See application file for complete search history.

(56) References Cited

U.S. PATENT DOCUMENTS

2005/0246991 A1    11/2005 Chen et al.

FOREIGN PATENT DOCUMENTS

EP                2 316 865 A1    5/2011

OTHER PUBLICATIONS

Jun. 4, 2012 International Search Report issued in International Application No. PCT/EP2011/072794.
Jun. 18, 2013 translation of the International Preliminary Report on Patentability issued in International Patent Application No. PCT/EP2011/072794.

*Primary Examiner* — Michael Orlando
(74) *Attorney, Agent, or Firm* — Oliff PLC

(57) ABSTRACT

This invention relates to a process for sealing an above-ground or underground structure. It involves in particular the use of non-reactive dispersion adhesive compounds. This process in particular has the advantage that good and long-lived adhesion can be achieved very quickly, and that in particular the non-reactive dispersion adhesives that are used have a small tendency to absorb the plasticizers present in the PVC sealing film, so that as a result this process is best suited to assure long-lasting adhesion of PVC films with various substrates.

12 Claims, 2 Drawing Sheets

US 8,778,131 B2

USE OF DISPERSION ADHESIVE-COATED POLYVINYL CHLORIDE SEALING FILMS FOR PRODUCING A SEAL

TECHNICAL AREA

The invention relates to the area of sealing an above-ground or underground structure and the area of dispersion adhesives.

STATE OF THE ART

PVC sealing films have been known for a long time. They have been also used for a long time for sealing roofs and roof structures. Traditionally, such films have been laid as adhesive strips on the roof and heat sealed together. To set such strips in place, till now primarily mechanical means of anchoring have been used to hold them in place, for example, nails. Naturally in this way assuring a watertight seal is a great problem.

PVC waterproofing membranes contain a large amount of plasticizers in order to ensure flexibility of the waterproofing membranes for the long term.

Adhering such PVC waterproofing membranes to the underlying area till now has not been successfully accomplished in practice, for it has been shown that the adhesive required for such adhesion absorbs plasticizers from the PVC waterproofing membrane, whereby the mechanical and other technical characteristics of the adhesive are soon very strongly negatively affected. As a result the adhesion seal is lost in a very short time.

Many well-known adhesives are also inappropriate since they require a relatively long time to assure an adhesive seal, for example since they undergo a cross-linking reaction.

This change is unacceptable for the assurance of long-term roof adhesive sealing.

Presentation of the Invention

The task of this invention is to make available a process that allows sealing an above-ground or underground structure reliably, and in particular to use an adhesive that causes a lower absorption of plasticizer in this process.

Surprisingly, it has been found that a process according to claim 1 is able to solve this problem. In particular, this process allows the realization in a very simple manner of the long held desire for full surface, long-term adhesion of a PVC strip to a substrate, in particular a roof or a roof structure, and thus to obtain optimal sealing. Surprisingly, it has been discovered that non-reactive dispersion adhesives are optimally suited for solving this problem, in particular polyurethane dispersion adhesives based on polyester polyols and ethyl-vinyl acetate copolymer dispersion adhesives. It has been shown as particularly advantageous that PVC films coated with dispersion adhesive compounds are non-tacky, and therefore can be stored over a long period, particularly in the form of rolls. When needed, they can be bonded to the substrate so that they are sealed by introducing heat during contact with the substrate to be sealed and subsequently cooling, and as a result a composite can be formed. It has been shown that this process leads very quickly to adhesive bonding, so that after a few minutes strong forces are already transferred between the PVC film and the substrate; in a test they are often so high that they lead to material failure in the substrate. This rapid buildup of strength is advantageous in that no mechanical fixing means such as clamps or the like are needed for the adhesion.

The sealing films revealed in this document can be easily produced, stored and shipped over a long period, and can be laid and adhered in a very simple way. In particular, no mechanical fastening means, such as nails or the like, are needed for laying and fixing. This reduces the vulnerability of films to damage. Consequently sources of leakiness are greatly reduced.

Other aspects of the invention are the subject of other independent claims. Especially preferred embodiments of the invention are the subject of dependent claims.

Ways of Executing the Invention

In a first aspect, this invention relates to a process for sealing an above-ground or underground structure. This process includes the following steps:

a) Applying a non-reactive dispersion adhesive compound onto a flexible polyvinyl chloride sealing film;
b) Flashing off the non-reactive dispersion adhesive compound to form a polyvinyl chloride sealing film coated with a dispersion adhesive compound which is non-tacky at room temperature;
c) Laying the polyvinyl chloride sealing film coated with flashed off dispersion adhesive compound onto the surface of an underground or above-ground structure, so that as a result the flashed off dispersion adhesive compound is disposed between the polyvinyl chloride sealing film and the surface;
d) Introducing heat with partial melting or adhering by melting of the dispersion adhesive compound flashed off;
e) Cooling of the dispersion adhesive compound flashed off by forming an adhesive binding between the flexible polyvinyl chloride sealing film and the surface of the structure.

In this document "sealing film" is understood to mean flexible, that is bendable, flat plastic, particularly in a thickness from 0.05 millimeters to 5 millimeters, which can be rolled up. Thus, in addition to films in the strict sense of having thickness under 1 millimeter, also, and preferably, sealing strips such as are typically used in a thickness of typically 1 to 3 mm for sealing tunnels, roofs, and swimming pools, and in special cases even in a thickness of up to 5 mm, are understood to be included. Such films are usually created by brushing, pouring, rolling on, or extruding, and are typically available commercially in rolls or are created on the spot. They can be made of a single layer or of several layers. It is clear to the person skilled in the art that films can contain other additional materials and processing agents, such as fillers, UV and heat stabilizers, plasticizers, lubricants, biocides, flame retardants, antioxidants, pigments such as titanium dioxide and lampblack, and dyes. This means that in this document films that are not made 100% of PVC or soft PVC or PET are also designated as PVC films or soft PVC films.

Standard PVC film, in particular a soft PVC film, is particularly well suited for the area of sealing buildings as a flexible polyvinyl chloride sealing film. Such PVC films contain in particular plasticizers, typically phthalate plasticizers.

In order to be able to be used in practice as a sealing film, it is important that these PVC films be flexible. The use of rigid PVC films would lead to a situation in which, during bending or recurving of the film, such as occurs during applying the film and in use, for example as a result of fluctuations in temperature or mechanical loads such as occur during walking or driving over the film, it might break or at least be torn, whereby the sealing function could no longer be assured. In addition, it is inevitable in practice that the sealing foil must be delivered to the construction site in roll form. A rigid PVC however cannot be rolled.

In order to optimize the mechanics of the flexible polyvinyl chloride sealing film, it is advantageous if the sealing film is reinforced with fibers. It is especially advantageous if the PVC sealing film is reinforced with fibers. Reinforcement with fibers can take place in the form of loose fibers or, preferably, using two-dimensional fiber objects. Preferably reinforcement by fibers occurs in that the PVC sealing film is reinforced with a fiber mat, a fiber layer, a fiber nonwoven material, a fiber scrim, or a fiber fabric. Particularly suited as fibers are fibers of glass, hydrocarbon, cellulose, cotton, or synthetic plastics, preferably fibers of polyester or of a homopolymer or copolymer of ethylene and/or propylene or of viscose. In terms of their form, the fibers may be used as short fibers or long fibers, or in the form of spun, woven, or nonwoven fiber materials. The use of fibers is in particular advantageous for improving the mechanical strength, in particular when at least a portion of the fibers are made of high tensile strength or extremely high tensile strength fibers, in particular of glass or aramide fiber. Preferred fibers are glass fibers or polyester fibers.

Particularly suitable PVC films are those sold by Sika Sarnafil AG, Switzerland, with the offered products Sikaplan®-12, Sikaplan®-15 G, Trocal® 12, Trocal® 15 SG, and products in the product lines Sarnafil® G410 and Sarnafil® S327.

Underground and above-ground structures are in particular buildings, houses, retaining walls, roofs, tunnels, and bridges. Especially preferred as an underground or above-ground structure are roofs, in particular flat roofs.

"Non-reactive" dispersion adhesive compounds in this document refer to a dispersion adhesive compound that has no polymers that react chemically with each other or with particles in the air at room temperature. Such non-reactive dispersion adhesive compounds in particular have polymers with no isocyanate, alkoxysilane, epoxide, or (meth)acrylate groups. Thus the non-reactive dispersion adhesive compound in particular has no epoxides, especially no solid epoxy resins.

In this document "room temperature" is understood as 25° C.

Moreover, non-reactive dispersion adhesive compounds exist as dispersions. A "dispersion" means a heterogeneous mixture of at least 2 materials that cannot be dissolved in one another or at least hardly can be so dissolved, do not chemically bond with each other, and have 2 phases. As part of this invention, dispersions are defined as such heterogeneous mixtures of a solid (suspension) or a liquid (emulsion) in another liquid.

The liquid phase of the dispersion is preferably a solvent, in particular an organic solvent with a boiling point under normal pressure of less than 120° C., preferably less than 90° C., or water.

Water is the preferred liquid phase. Therefore the non-reactive dispersion adhesive compound is preferably an aqueous dispersion. Preferably the dispersion adhesive compound has a liquid phase and a solid phase.

Since the compound exist as a dispersion, it is obvious that such a solvent in this connection is not in a position completely to dissolve the solids of the solid phase or the second liquid. Ordinarily water is the preferred liquid phase.

What has turned out to be particularly well suited are, on the one hand, non-reactive dispersion adhesive compounds on polyurethane dispersions based on polyester polyol and, on the other hand, dispersions containing copolymers obtained from the free radical polymerization of at least 2 monomers with at least one, preferably one, unsaturated C=C double bond.

Polyester polyol-based polyurethanes are preferably manufactured from the reaction of polyisocyanates and polyester polyols, preferably those that are solid at room temperature. Polyester polyols in turn are made by polycondensation of hydroxycarboxylic acids or the polycondensation of aliphatic and/or aromatic polycarboxylic acids with di- or more-valent alcohols, preferably short chain polyols, preferably diols or triols with a molecular weight of less than 250 g/mol, especially less than 150 g/mol, or polyether polyols and dicarboxylic acids or dicarboxylic acid anhydrides in appropriate stoichiometry, so that the reaction products have hydroxyl groups, and thus represent polyester polyols. Especially preferred as polyester polyols are condensation products from ethylene glycol, diethylene glycol, propylene glycol, dipropylene glycol, neopentyl glycol, 1,4-butane diol, 1,5-pentane diol, 3-methyl-1,5-hexane diol, 1,6-hexane diol, 1,8-octane diol, 1,10-decane diol, 1,12-dodecane diol, glycerin, [or] 1,1,1-trimethylol propane with organic di- or tri-carboxylic acids, in particular dicarboxylic acids, or their anhydrides or esters, such as succinic acid, glutaric acid, adipic acid, trimethyladipic acid, suberic acid, azelaic acid, sebacic acid, maleic acid, fumaric acid, phthalic acid, phthalic acid anhydride, isophthalic acid, terepthalic acid, trimellitic acid, and trimellitic acid anhydride.

Especially suitable monomers for the creation of copolymers are selected from the group consisting of (meth)acrylic acid, (meth)acrylic acid esters, (meth)acrylic acid amides, ethylene, propylene, butylene, isobutylene, butadiene, isoprene, styrene, acrylonitrile, vinyl esters, and allyl ether. Such copolymers are in particular manufactured by free radical emulsion or solvent polymerization. Based on the reaction mechanism, the polymerization occurs via the double bonds. Therefore the copolymers no longer have any (meth)acrylic acid, (meth)acrylic acid ester, or (meth)acrylic acid amide groups.

Especially preferred copolymers of this type are ethylene/vinyl acetate copolymers.

Preferably the non-reactive dispersion adhesive compound is or contains a polyurethane dispersion, in particular on a polyurethane dispersion based on a polyester polyol.

It turned out to be especially suitable that the non-reactive dispersion adhesive compound contains a polyurethane dispersion, in particular a polyurethane dispersion based on a polyester polyol, and at least one copolymer, obtained from the free radical polymerization of at least 2 monomers with at least one, preferably one, unsaturated C=C double bond, preferably an ethylene/vinyl acetate copolymer, wherein the weight ratio between the polyurethane dispersion and the copolymer consisting of at least 2 monomers with an unsaturated C=C double bond is 100:30-30:70, in particular 50:50.

The proportion of polyurethane based on polyester polyol, and copolymer obtained from the free radical polymerization of at least 2 monomers with at least one, preferably one, unsaturated C=C double bond, out of the total weight of the non-reactive dispersion adhesive compound is preferably between 30 and 70% by weight, in particular between 50 and 40% by weight.

Preferably the non-reactive dispersion and agent compound has a liquid phase and a solid phase.

The solid phase includes in particular one polymer that is solid at room temperature.

It is also preferred that the solid portion of the non-reactive dispersion adhesive compound have a melting temperature of 60-120° C., especially 70-90° C.

The polymers solid at room temperature are in particular the polyurethanes and copolymers already mentioned and preferably based on polyester polyol, which are obtained from the free radical polymerization of at least 2 monomers with at least one, preferably one, unsaturated C=C double bond.

The non-reactive dispersion adhesive compound is preferably an aqueous dispersion.

In such an aqueous dispersion, the fraction of water out of the weight of the entire non-reactive dispersion adhesive compound is preferably between 30 and 70% by weight, in particular between 40 and 60% by weight.

The solid or second liquid phase and the liquid phase are created in the normal manner for manufacturing. Especially preferred is an on-site preparation, i.e., precursors which lead the solid phase or the second liquid phase into the liquid phase, are mixed under intensive stirring and reacted with each other. A very appropriate method for this is the emulsion polymerization of at least two monomers with an unsaturated C=C double bond in the liquid phase, which can lead directly to a desired dispersion.

It is at times also advantageous to mix two or more dispersions already existing as dispersions with each other.

The production of such non-reactive dispersion adhesive compounds occurs in the manner known to the person skilled in the art. In order to obtain the best possible dispersions, it is preferred that high-speed mixers, in particular rotor-stator dispersing equipment, be used in the production In step a) of the process, the non-reactive dispersion adhesive compound 2 is applied to a flexible polyvinyl chloride sealing foil 1. Applying the non-reactive dispersion adhesive compound to the polyvinyl chloride sealing film can occur in particular through blade coating, spraying, brushing, stamping, rolling, casting, painting, roll coating, or immersion.

The non-reactive dispersion adhesive compound can be applied over the whole surface, in a grid pattern, or with a special pattern.

Then in step b) the non-reactive dispersion adhesive compound 2 is flashed off. In this way a polyvinyl chloride sealing film 4 coated with dispersion adhesive compound 3 and flashed off is formed, which is non-tacky at room temperature.

Flashing off causes the solvent or the water to evaporate. The so-called flashing-off time, that is, the time that elapses from the application of the non-reactive dispersion adhesive compound until the compound is dry, that is, non-tacky, is preferably 10 to 240 minutes, in particular 30 to 90 minutes.

Flashing off can be speeded up by a flashing-off means. A flashing-off means can, for example be a blower, in particular an air blower, preferably with heated air, or an IR radiation source may serve for the purpose. Flashing off may be done at room temperature or at slightly elevated temperature, in particular at a temperature below 60° C.

The amount of the non-reactive dispersion adhesive compound applied in step a) to is preferably selected such that the thickness of the coat of the dispersion adhesive compound 3 flashed off after step b) is between 50 and 500 microns, in particular between 100 and 250 microns.

The flashed off polyvinyl chloride sealing film coated with dispersion adhesive compound produced in this manner may be trimmed, cut, rolled up, or further directly processed as needed. The rolls of the coated plastic films can now be stored or transported as needed.

Steps a) and b) preferably take place in an industrial process in a film plant, and the coated polyvinyl chloride sealing film preferably reaches the construction site in the form of coated polyvinyl chloride sealing film for use from a roll. This is especially advantageous since the flashing off does not have to occur at the building site, which—if the dispersion adhesive compound is solvent-based—is advantageous on occupational health, industrial safety, and eco-toxicological grounds, since the evaporated solvent can be more easily and more efficiently collected in a film plant, and thus the solvent will be prevented from getting into the environment or catching fire. In addition, one does not have to wait at the construction sites until the dispersion compound is flashed off, and thus significantly accelerated work is permitted at the construction site. Based on the property that the flashed-off dispersion adhesive compound is non-tacky, the coated film can be simply rolled up, stored and transported in a space-saving manner as a roll, and unrolled as needed. Preferably individual layers on the roll do not adhere to one another, meaning that preferably no blocking in the rolls arises during storage, in particular long-term storage. In certain, non-preferred cases, it can however be indicated that blocking can be completely avoided by applying a separating paper, in particular a siliconized separating paper, onto the coated film before rolling up.

In a step c) after step b), the polyvinyl chloride sealing film 4 coated with dispersion adhesive can be laid on the surface 5 of an underground or above-ground structure 6. Laying the coated film is done in such a way that the flashed off dispersion adhesion compound 3 is disposed between the polyvinyl chloride sealing film 1 and the surface 5.

The film is movable on the surface because of the lack of tackiness of the flashed off dispersion adhesive compound. However, based on the inherent weight of the PVC film coated with the adhesive, a certain minimum force is required for this moving. This is therefore an advantage because an undesired move can thus be prevented. For example, on inclined surfaces undesired slippage or blowing off because of slight winds can generally be prevented. The minimum force necessary for moving can on the one hand be adjusted through the choice of the additives (e.g., fillers) or the thickness of the film; on the other hand, the surface structure of the flashed off dispersion adhesive compound can extensively affect the stiction. For example, the stiction can be increased by a rough adhesive surface, which for example is a result of an uneven application of adhesive or adhesive applied in the form of a grid.

The surface of the structure can consist of various materials. In particular, such surface materials are construction materials such as concrete, plaster, stone, brick, mortar, fiber cement, and natural stone such as granite or marble; metals or alloys such as aluminum, steel, non-ferrous metals, and galvanized metals; wood, insulating foam, polyisocyanurate resins (PIR); coated substrates such as coated metals or alloys; as well as paints and varnishes. Particularly preferred are materials that are used as roof underlayers.

If needed, the substrates can be pre-treated before applying the adhesive or the sealing material. Such pre-treatments include in particular physical and/or chemical cleaning processes, for example, grinding, sandblasting, brushing, or similar methods, or treating with cleaning agents, solvents, or applying a bonding agent, a bonding solution, or a primer.

In one embodiment of the invention, as in the described process, the surface 5 of an underground or above-ground structure 6 is a surface 5' coated with a flashed-off dispersion adhesive compound 3, as obtained through the additional steps a') and b'):

a') Applying a non-reactive dispersion adhesive compound 2 onto the surface 5 of an underground or above-ground structure 6;

b') Exposing the non-reactive dispersion adhesive compound to air (2) while forming a surface 5' coated with a flashed off dispersion adhesive compound 3.

It is crucial here that that steps a') and b') take place before step c).

In a further step d), heat is introduced, so that the flashed-off dispersion adhesive compound 3 begins to melt or fuses.

The introduction of heat can preferably occur in step d) during the application of the polyvinyl chloride sealing film 4 coated with the dispersion adhesive in step c), in particular into the gap 7 formed during the application between the polyvinyl chloride sealing film 4 coated with the dispersion adhesive and the surface 5 of the structure 6.

In a further embodiment, the heat in step d) is introduced to the side of the polyvinyl chloride sealing film 4 opposite the dispersion adhesive compound, and transferred by (through) the polyvinyl chloride sealing film 4 onto the dispersion adhesive compound.

The introduction of heat can be done with hot air, flame, induction, or dielectric heating. The introduction of the heat occurs preferably in such a way that the heat does not excessively thermally negatively affect or destroy the film, the adhesive, or the material of the surface of the structure.

In this way the dispersion adhesive compound is fused or partially melted, and the flashed off dispersion adhesive compound is at least partially flowable, whereby an intimate bonding with the surface of the structure is assured.

The heating of the adhesive thus occurs in particular to an adhesive temperature of 60 to 120° C.

In a step e) after step d), the flashed off dispersion adhesive compound 3 is cooled, forming an adhesive bond between the flexible polyvinyl chloride sealing film 1 and the surface of the structure 6. This cooling typically occurs without other additives. In certain cases, however, it can be advisable and advantageous if the cooling should be accelerated, if for example the film after a short time is supposed to bear a load or be walked on. This can for example be done by having a cooling means cool the film or the structure, such as a blower, particularly an air blower.

Through this process as described the underground or above-ground structure is sealed. This sealing is in particular a sealing against water, in particular against rain water or construction water. With this process, structures can be reliably sealed for long periods of time, typically several years, in particular more than 10 or 20 years.

In this way the use of a polyvinyl chloride sealing film 3 coated with a non-reactive flashed off dispersion adhesive which is non-tacky at room temperature forms another aspect of this invention for the sealing of an underground or above-ground structure.

Finally, a composite 9 forms another aspect of this invention.

This composite 9 has
i) A layer of a polyvinyl chloride sealing film 1
ii) A layer of a flashed off dispersion adhesive compound 3
iii) An underground or above-ground structure 6.

The layer of the flashed off dispersion adhesive compound 3 is hereby disposed between the layer of the polyvinyl sealing film 1 and the underground or above-ground structure 6.

In this case the underground or above-ground structure 6 is in particular a roof.

BRIEF DESCRIPTION OF THE DRAWINGS

In the following the invention will be more closely described with the aid of figures based on preferred embodiments, whereby it is noted that only the elements essential for direct understanding of the invention are shown. Equivalent elements in the various figures are labeled with equivalent symbols. It is also pointed out that the figures shown here are schematic representations without size relationships.

They show.

Figure 1:
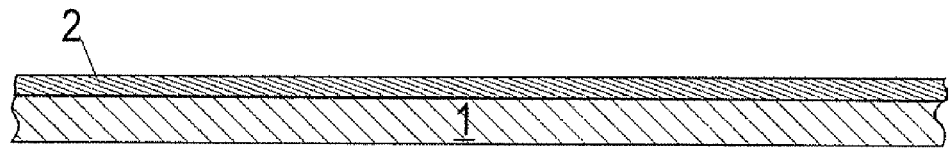
FIG. 1 a schematic cross-section through a flexible polyvinyl chloride sealing film or waterproofing membrane, on which a non-reactive dispersion adhesive compound has been applied.

The following figures schematically show individual steps of a process to seal an underground or above-ground structure:

FIG. 1 shows a flexible polyvinyl chloride sealing film 1, on which in step a) a non-reactive dispersion adhesive compound 2 was applied as a layer. The application occurred for example through blade coating.

Figure 2:
FIG. 2 a schematic cross-section through a polyvinyl chloride sealing film or waterproofing membrane coated with flashed off dispersion adhesive compound.

FIG. 2 shows the sealing film of FIG. 1 after the non-reactive dispersion adhesive compound 2 has been flashed off in step b). Flashing off here typically takes 30 to 90 minutes. Flashing off results in a polyvinyl chloride sealing film 4 coated with flashed off dispersion adhesive compound 3, which is non-tacky at room temperature. The lack of tackiness makes it possible for the adhesive or the foil to be rolled up without problems, as described in FIG. 3. In addition, the film is freely movable and does not stick in an undesirable way to a substrate; it is therefore advantageous in that dust or other small particles do not remain stuck to the surface and thus contaminate the surface of the film or give it an unsatisfactory appearance.

Figure 3:
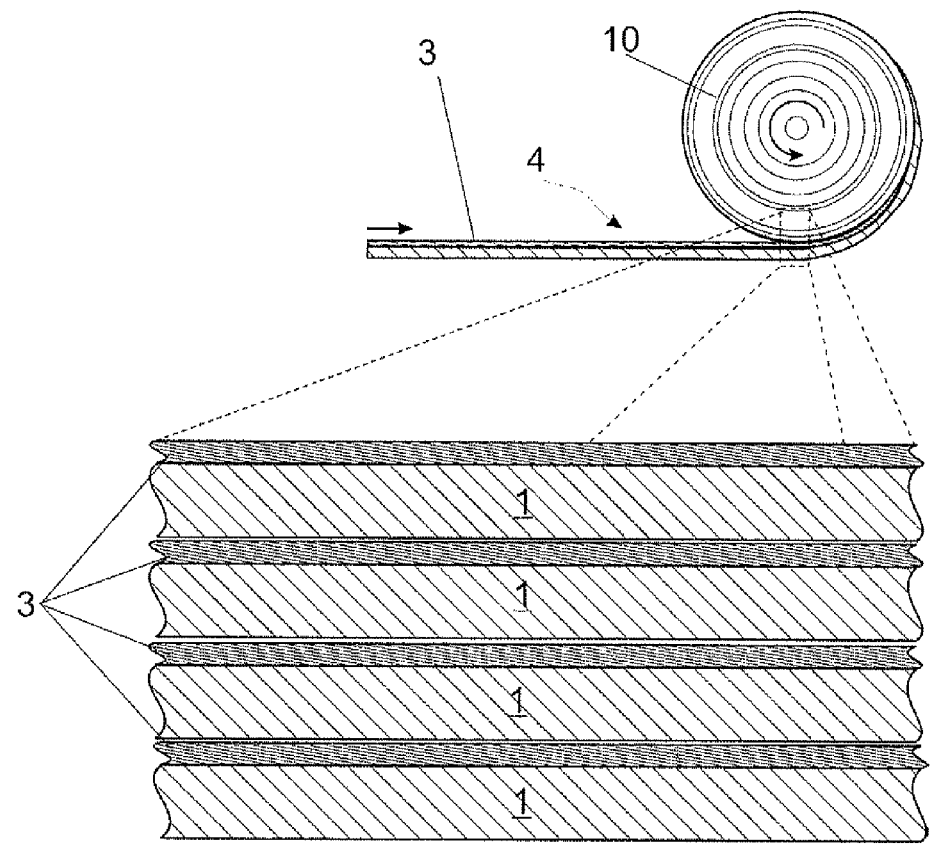
FIG. 3 a schematic cross-section through a polyvinyl chloride sealing film coated with dispersion adhesive compound flashed off rolled up into a roll.

FIG. 3 shows that the polyvinyl chloride sealing film 4 or waterproofing membrane 4 coated with the flashed off dispersion adhesive compound 3 can be rolled up into a roll 10. In the embodiment shown here, the rolling takes place without the use of a siliconized separating paper, which would be laid on the adhesive when rolling up and which would then prevent individual layers in the roll from sticking to each other. As shown in the enlargement in the lower part of FIG. 3, this is not necessary in the embodiment shown. Here the individual layers lie in direct contact with one another. Based on the lack of tackiness of the flashed off adhesive, such a roll does not block. The roll 10 can be stored over long periods of time and transported in a space-saving manner, unrolled at the film plant or at the construction site when needed, and if necessary trimmed to the desired strip length.

Figure 4:
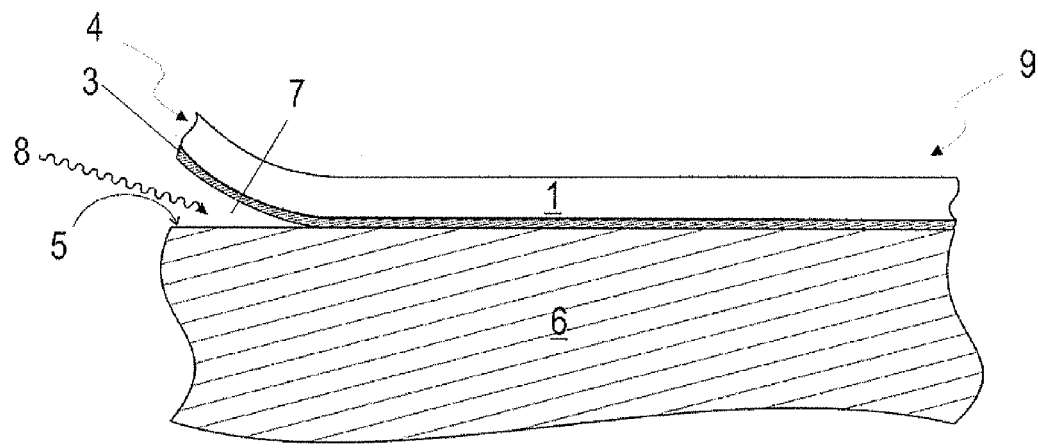
FIG. 4 a schematic cross-section through a composite during its manufacture in a first embodiment.
Figure 5:
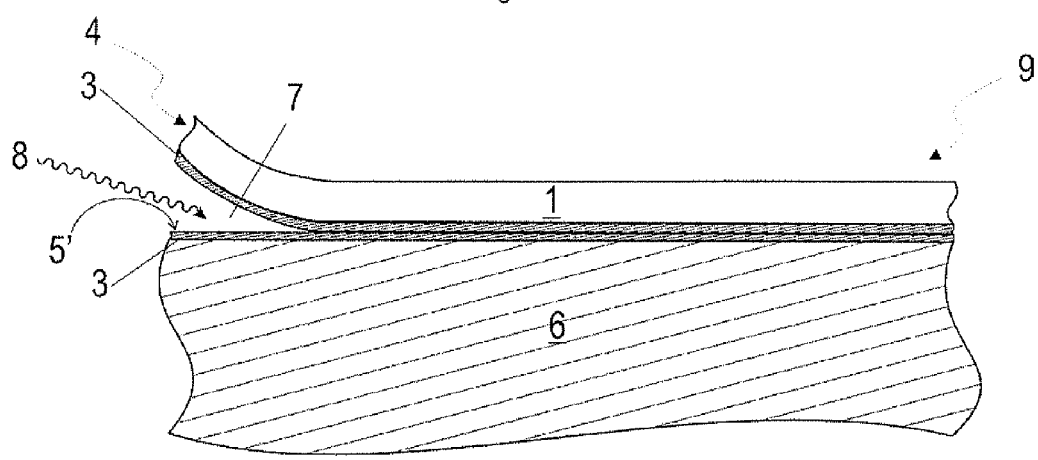
FIG. 5 a schematic cross-section through a composite during its manufacture in a second embodiment.

FIGS. 4 and 5 show steps c) and d) of the process.

A first embodiment is shown in FIG. 4. Here the polyvinyl chloride sealing film 4 coated with flashed off dispersion adhesive compound 3 is applied as in step c) to the surface 5 of an underground or above-ground structure 6. Due to the lack of tackiness of the film, it can be moved on the surface 5, whereby for example a final positioning of the film is made possible. Because of the weight of the film, it has a certain inertia, and in particular extensively prevents undesired movement, for example through slipping or the effect of the wind. Moreover, FIG. 4 shows a variant of step d). Here the introduction of heat in step d) takes place during application of the polyvinyl chloride sealing film 4 coated with the dispersion adhesive in step c) into the gap 7 formed during the application between the polyvinyl chloride sealing film 4 coated with dispersion adhesive and the surface 5 of the structure 6. As a result of the heat, fusion or partial melting of the flashed off dispersion adhesive compound 3 occurs. Thus the dispersion adhesive compound becomes at least partially flowable and can contact the surface 5 of the structure. In the next step e), the flashed-off dispersion adhesive compound 3 is cooled once again, whereby an adhesive bond forms between the flexible polyvinyl chloride sealing film 1 and the surface of the structure 6; as a result, a composite forms. This composite 9 has a layer of a polyvinyl chloride sealing film 1, a layer of a flashed off dispersion adhesive compound 3, and an underground or above-ground structure 6. The layer of the flashed off dispersion adhesive compound 3 is hereby disposed between the layer of the polyvinyl sealing film 1 and the underground or above-ground structure 6.

FIG. 5 shows a second embodiment. Essentially this corresponds to FIG. 4, except that the surface 5 of the structure shows a surface 5' coated with a flashed off dispersion adhesive compound 3. Such a surface 5' is obtained before laying via the additional steps a') and b'). In step a'), a non-reactive dispersion adhesive compound 2 was applied to the surface 5 of an underground or above-ground structure 6, and then the non-reactive dispersion adhesive compound 2 was flashed off to create a surface 5' coated with a flashed off dispersion adhesive compound 3. Then step c) was performed.

Figure 6:
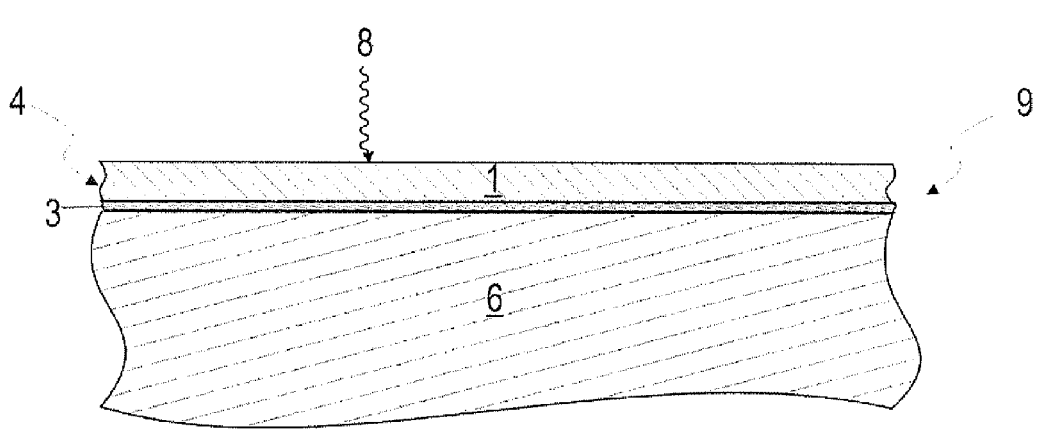
FIG. 6 a schematic cross-section through a composite during its manufacture in a third embodiment.

FIG. 6 shows a third embodiment. Here the heat is supplied by a heat source 8 in step d) on the side of the polyvinyl chloride sealing film 4 opposite the dispersion adhesive compound, and transferred via the polyvinyl chloride sealing film (4) onto the dispersion adhesive compound. As a result of the heat, fusion or partial melting of the flashed off dispersion adhesive compound 3 occurs. In this way the dispersion adhesive compound becomes at least partially flowable and can form a bond with the surface 5 of the structure. In the next step e) the flashed off dispersion adhesive compound 3 is again cooled, whereby an adhesion bond forms between the flexible polyvinyl chloride sealing film 1 and the surface of the structure 6; as a result, as described in FIG. 5, a composite is formed.

EXAMPLES

In the following, the invention will be illustrated on the basis of examples.

The adhesive compounds given in table 1 were produced. The comparison adhesive Ref. 1 is Sarnacol 2170, Sika Sarnafil AG, Switzerland, which is a commercial solvent-based contact adhesive made with synthetic rubber. Subsequently, an adhesive was made with Ref. 2 which represents a solution of a thermoplastic polyurethane in a solvent. In the dispersion adhesives according to the invention 1 to 5, the following EVA dispersions and/or polyester dispersions were used:

EVA-Disp.1: aqueous EVA dispersion. Proportion of water: 48% by weight. EVA proportion: 52% by weight, glass transition temperature: 6° C., particle size: 1 μm.

Polyester-Disp.1: anionic aqueous polyurethane dispersion based on polyester polyol.

Proportion of polyurethane: 40% by weight; water proportion: 60% by weight, viscosity 150 m·Pas (DIN 53018)

TABLE 1

Compounds and results

| | Ref. 1 | Ref. 2 | 1 | 2 | 3 | 4 | 5 |
|---|---|---|---|---|---|---|---|
| Methyl ethyl ketone (%) | | 80 | | | | | |
| Desmocoll 526 (%) | | 20 | | | | | |
| EVA-Disp.1 [%] | | | 50 | 50 | 30 | 70 | |
| Polyester-Disp.1 [%] | | | 50 | 50 | 70 | 30 | 100 |
| Adhesive application | PVC PIR | PVC PIR | PVC PIR | PIR | PVC PIR | PVC PIR | PVC PIR |
| Peel value after 5 minutes | 0 | MB | MB | MB | MB | MB | MB |
| Peel value after 3 days | MB | MB | MB | MB | MB | MB | MB |
| Plasticizer absorption (%) | 60 | 23 | 12 | 12 | 6.3 | 10 | 13 |

The adhesives were applied by blade coating on one side in an amount of 200 g/m² onto Sarnafil® G410-12 EL, a PVC sealing film (thickness 1.5 mm, reinforced with glass non-woven material), commercially available from Sika Sarnafil AG, Switzerland. In all the examples with the exception of example 2, the respective adhesive was applied by blade coating at 200 g/m² onto a thermal insulation panel made of polyisocyanurate resin (PIR). The adhesives were flashed off for 15 minutes. The substrates coated in this way were cut into strips of 5×20 cm. The PVC films coated with flashed off adhesive were laid on the PIR substrate coated with flashed off adhesive (in example 2: onto the untreated PIR substrate), heated in the gap to 70° C., and pressed with a 5 kg roller.

The adhesion, based on the peel value, was measured on the test pieces thus created after 5 minutes and after 3 days of storage at room temperature (i.e., the test bodies were cooled) as follows:

Immediately after the assembling, the peeling resistance of the bond was tested with a tensile testing machine (angle 90°, advance speed 100 mm/min). If the PIR failed upon measurement in this test, the notation "MB" (=break in material in the PIR) was given in the table.

In addition, the absorption of the plasticizer was determined as follows: Films with a wet layer thickness of 0.8 mm were cast from the adhesive. After complete drying of the films, these were weighed ($m_0$) and dipped into diisononyl phthalate at 50° C., a standard plasticizer used in PVC. After 20 hours of storage in diisononyl phthalate at 50° C., the films were taken out, washed off, and again weighed (ma The plasticizer absorption in % was calculated as follows:

Plasticizer absorption=$(m_L-m_0)/m_0$

A plasticizer absorption of more than 15%, in particular of more than 25%, is an unacceptable value, for with it the long-term durability of the bond is endangered.

The results in Table 1 show that the adhesives according to the invention have exceptionally good initial adhesion and long-term adhesion; in addition, they have extraordinarily low plasticizer absorption. It was also shown that in particular, mixtures of EVA dispersions and polyurethane dispersions based on polyester polyol have exceptionally low absorptions of plasticizer.

LIST OF SYMBOLS

1 Flexible polyvinyl chloride sealing film or waterproofing membrane
2 Non-reactive dispersion adhesive compound
3 Flashed off dispersion adhesive compound 4 Polyvinyl chloride sealing film or waterproofing membrane coated with flashed off dispersion adhesive compound
5 Surface
5' Surface coated with flashed off dispersion adhesive compound 3
6 Underground or above-ground structure
7 Gap
8 Heat source
9 Composite
10 Roll

The invention claimed is:

1. A process for sealing an underground or above-ground structure, comprising:
   a) applying a non-reactive dispersion adhesive compound to a flexible polyvinyl chloride sealing film;
   b) exposing the non-reactive dispersion adhesive compound to air while forming a polyvinyl chloride sealing film coated with a dispersion adhesive compound which is non-tacky at room temperature;
   c) laying the polyvinyl chloride sealing film coated with dispersion adhesive compound onto the surface of an underground or above-ground structure, so that as a result the dispersion adhesive compound is disposed between the polyvinyl chloride sealing film and the surface;
   d) introduction of heat with fusion or partial melting of the dispersion adhesive compound; and
   e) cooling of the dispersion adhesive compound, forming an adhesive bond between the flexible polyvinyl chloride sealing film and the surface of the structure.

2. The process according to claim 1, wherein the non-reactive dispersion adhesive compound is or contains a polyurethane dispersion.

3. The process according to claim 1, wherein the non-reactive dispersion adhesive compound is a copolymer, obtained from free radical polymerization of at least two monomers with at least one unsaturated C=C double bond.

4. The process according to claim 1, wherein the non-reactive dispersion adhesive compound contains a polyurethane dispersion, and at least one copolymer obtained from the free radical polymerization of at least two monomers with at least one unsaturated C=C double bond, whereby the weight ratio between the polyurethane dispersion and the copolymer consists of at least two monomers with an unsaturated C=C double bond with a value of 100:30-30:70.

5. The process according to claim 1, wherein the non-reactive dispersion adhesive compound has a liquid phase and a solid phase.

6. The process according to claim 5, wherein the solid form of the non-reactive dispersion adhesive compound has a melting temperature of 60-120° C.

7. The process according to claim 1, wherein the non-reactive dispersion adhesive compound is an aqueous dispersion.

8. The process according to claim 7, wherein the fraction of water in the weight of the entire non-reactive dispersion adhesive compound is between 30 and 70% by weight.

9. The process according to claim 1, wherein the thickness of the coating of the flashed off dispersion adhesive compound according to step b) is between 50 and 500 microns.

10. The process according to claim 1, wherein the surface of an underground or above-ground structure is a surface coated with a dispersion adhesive compound, as obtained through the additional steps a') and b')
    a') applying a non-reactive dispersion adhesive compound onto the surface of an underground or above-ground structure;
    b') exposing the non-reactive dispersion adhesive compound to air, forming a surface coated with a dispersion adhesive compound,
    with the provision that steps a') and b') take place before step c).

11. The process according to claim 1, wherein the introduction of heat in step d) occurs during laying the polyvinyl chloride sealing film coated with the dispersion adhesive in step c).

12. The process according to claim 1, wherein the heat in step d) is introduced on the side of the polyvinyl chloride sealing film opposite the dispersion adhesive compound, and is transferred via the polyvinyl chloride sealing film to the dispersion adhesive compound.

* * * * *